United States Patent [19]
Dotson et al.

[11] 3,862,296
[45] Jan. 21, 1975

[54] CONVERSION PROCESS FOR WASTE NITROGEN-CONTAINING COMPOUNDS

[75] Inventors: James M. Dotson, Danville; Thomas E. Peters, Livermore, both of Calif.

[73] Assignee: General Electric Company, San Jose, Calif.

[22] Filed: Feb. 9, 1972

[21] Appl. No.: 224,854

[52] U.S. Cl. .................. 423/251, 23/288 S, 55/74, 210/20, 210/49, 210/50, 210/59, 423/19, 423/261, 423/351

[51] Int. Cl...... B01d 35/00, B01j 1/22, C22b 59/00

[58] Field of Search....... 23/284, 288 S, 158; 55/72, 55/84, 85, 74; 210/20, 59, 50, 49, 56; 423/351, 580, 19, 251, 260, 261

[56] References Cited
UNITED STATES PATENTS

| | | | |
|---|---|---|---|
| 2,975,025 | 3/1961 | Cohn et al. | 423/239 |
| 3,257,777 | 6/1966 | Weisse | 55/72 X |
| 3,647,373 | 3/1972 | Huska et al. | 23/284 X |
| 3,673,086 | 6/1972 | Drobnik | 210/59 |
| 3,677,716 | 7/1972 | Weber et al. | 23/288 S |

OTHER PUBLICATIONS

"College Chemistry," D. C. Heath and Company, Boston, pp. 348, 356, 357, Nitrogen and Ammonia, 1957.

*Primary Examiner*—Charles N. Hart
*Assistant Examiner*—Robert H. Spitzer
*Attorney, Agent, or Firm*—Ivor J. James, Jr.; Sam E. Laub; Samuel E. Turner

[57] ABSTRACT

This presents a process for converting nitrogen-containing compounds in which at least a portion of the nitrogen has a positive valence to molecular nitrogen by calcining the nitrogen-containing compounds in a fluidized bed in the presence of a reducing agent selected from the group consisting of ammonia, ammonium compounds and mixtures thereof.

23 Claims, 2 Drawing Figures

CONVERSION PROCESS FOR WASTE NITROGEN-CONTAINING COMPOUNDS

BACKGROUND OF THE INVENTION

Nitrogen-containing compounds have various utilities in industry and agriculture, particularly nitrogen-containing compounds in the form of nitrates, nitrides and acids such as nitric acid. For example, the largest use of nitric acid is in the production of ammonium nitrate which is used as a fertilizer. Nitric acid is also used in the manufacture of cyclohexanone, which in turn is the raw material for adipic-acid and E-caprolactam which are monomers for the nylon compounds. Nitric acid is also employed for stainless steel pickling and other metallic etching processes. Other examples of nitrogen-containing compounds with various utilities are the azo and azine dyes, amino resins and plastics and ammonium compounds.

The various uses of nitrogen-containing compounds in industrial processes result in a disposal problem for large quantities of waste containing nitrogen compounds, for example spent baths of nitric acid used in pickling stainless steel. Since certain nitrogen-containing compounds are known to support plant life, and in particular algae, disposal of spent or used nitrogen-containing compounds can create water pollution problems such as the undesirable growth of algae in water bodies in which the nitrogen-containing compounds are discharged.

Accordingly, it is desirable to convert (or "to destroy") waste nitrogen-containing compounds into molecular nitrogen for release to the atmosphere by means of a chemical reaction with an appropriate reactant under appropriate reaction conditions. Various chemical reactions with waste nitrogen-containing compounds have been attempted with varying degrees of success. In work conducted at the National Reactor Testing Station at Idaho Falls, a submerged or "in-bed" flame fed by natural gas was used to attempt burning of waste nitrogen-containing compounds. This represents a costly process which has incomplete conversion of the nitrogen-containing compounds to molecular nitrogen. In another instance carbon monoxide has been used in thermal processes to convert the nitrogen-containing compounds to nitrogen gas, but this reaction was sluggish. The reaction was speeded up by using large excesses of carbon monoxide which involves added expense for conversion of nitrogen-containing compounds to molecular nitrogen. Further, the excess carbon monoxide from this reaction is an air pollutant and further expense is encountered in converting the carbon monoxide to carbon dioxide.

In one reaction for converting waste or spent nitric acid as shown in U.S. Pat. No. 2,975,025, the acid was reacted with a reducing agent of formic acid giving a gaseous product comprising a mixture of nitrous and nitric oxides which are both undesirable gaseous products for discharge to the atmosphere. In another reaction for converting waste nitric acid to a gaseous product, a thermal decomposition of the nitric acid was attempted but this also gave a gaseous product comprising a mixture of nitrous and nitric oxides.

Accordingly, it has remained desirable to achieve a process for converting waste nitrogen-containing compounds to molecular nitrogen, particularly compounds containing nitrate ions and this forms one of the objects of this invention.

Such a process would have particular utility in the nuclear industry for reprocessing irradiated nuclear fuel withdrawn from nuclear reactors used in the generation of electric power.

In general, a nuclear reactor is made up of a chain-reacting assembly including nuclear fuel material contained in fuel elements having various geometric shapes such as plates, tubes, or rods. These fuel elements are usually provided with a corrosion resistant, non-reactive heat conductive layer or clad on their external surfaces. In power reactors, these elements are usually grouped together at fixed distances from one another in a coolant flow channel or region forming what is termed a fuel assembly. A sufficiently large number of such assemblies are combined together in the chain reacting assembly or core to permit a controllable self-sustained nuclear fission chain reaction. The reactor core is enclosed within a container through which the reactor coolant is circulated. In thermal neutron reactors, a neutron moderator is also provided and in some cases this moderator may also perform as the reactor coolant. The known boiling water and pressurized water reactors are examples of such thermal reactors.

The nuclear fuel material contains sufficient amounts of one or more of the fissionable atoms such as U-233, U-235, Pu-239 or Pu-241. This nuclear fuel material may be in elemental or compound form. Upon absorption of a neutron by a nucleus of such a fissionable atom, a nuclear disintegration frequently results. In some nuclear reactor fuel elements, fertile atoms such as U-238 may be included in addition to the above noted fissionable atoms. A fairly common, currently used nuclear reactor fuel material consists of enriched uranium dioxide ($UO_2$) in which approximately 2.0% of the uranium atoms are U-235 which are fissionable by thermal neutrons, while the remaining 98% is U-238 which is not so fisssionable to any significant degree. For the nuclear reactor fuel material to contain a concentration of 2.0% uranium-235 atoms, naturally occurring uranium must be enriched with the U-235 isotope. The enrichment of uranium customarily takes place through use of the compound uranium hexafluoride so that a process is required for converting uranium hexafluoride into uranium dioxide in a form which can be readily fabricated to shaped bodies having a low fluoride content. One practice for converting uranium hexafluoride to uranium dioxide employs hydrolysis of uranium hexafluoride to form an aqueous solution of uranyl fluoride. A dilute aqueous solution of ammonium ion is added to the aqueous solution of uranyl fluoride to precipitate ammonium diuranate. After filtration the ammonium diuranate, which has a high fluoride ion content, is dissolved in nitric acid and fluoride decontamination of the resulting uranyl nitrate solution is accomplished by solvent extraction. From the resulting purified uranyl nitrate solution, ammonium diuranate is re-precipitated and then calcined to give $UO_2$ which in turn is reduced with hydrogen to give uranium dioxide. In this process scrap fuel is recovered using nitric acid so that the fuel in nitrate form can be reused at the appropriate stage in the ammonium diuranate process. However, the scrap recovery using nitric acid results in a nitrate waste solution containing, among other materials, ammonium nitrate. Nitric acid is also used in this ammonium diuranate process to flush lines to prevent the accumulation of solid deposits in the line and this gives an ammonium nitrate-containing solution normally discarded as waste. Further anion exchange resins are employed in the ammonium diuranate process in the clarification step which gives additional nitrate-containing solution normally discarded as waste. In addition, the cladding used to contain the uranium dioxide pellets is typically a zirconium-containing alloy which is etched with nitric acid prior to loading of the uranium dioxide fuel material. After a period of time, there is a build up of a metallic nitrate concentration in the nitric acid solution.

It is another object of this invention to provide a process for converting the waste nitrogen-containing compounds from the foregoing processing of nuclear fuel and cladding into molecular nitrogen for release to the atmosphere.

In the course of operating a reactor fueled with fissionable and fertile atoms of uranium dioxide as discussed above, the fissionable atoms originally present are gradually consumed and simultaneous neutron irradiation of the fertile atoms, U–238, converts a part of them into fissionable atoms (Pu–239). Initially, the concentration of these newly created fissionable atoms gradually rises with irradiation and then approaches an equilibrium value. These atoms are fissionable by thermal neutrons and thus contribute to the maintenance of the chain fission reaction so that the reaction may be continued longer than would have been the case if only an original charge of fissionable atoms was available. Since the rate at which fissionable atoms are created by fertile atom conversion is (except in breeder-converter type of reactor) always less than the rate at which the original fissionable atom charge is consumed during operation, the reactor can maintain this heat generation at a given power level for only a finite length of time. Ultimately the maximum power level at which the reactor can operate must be decreased and finally the reactor must be shut down for refueling. Some or all of the irradiated fuel assemblies are removed and replaced with new fuel assemblies having a higher concentration of fissionable atoms and no fission product poisons. The reactivity of the refueled reactor core is higher and the original power level can thus be restored.

The irradiated reactor fuel removed from the reactor ordinarily contains a valuable, unconsumed quantity of fissionable material and a significant quantity of fissionable material converted from many fertile materials which was a component of the original fuel. Irradiated fuel also contains fission products including neptunium-237, rubidium, cesium and lanthanum. The metallic fission products can have various uses in addition to posing a disposal problem. For example, while neptunium-237 may have other uses, one current use in the production of plutonium-238 by further nuclear irradiation.

It has been recognized as desirable to reprocess the irradiated nuclear fuel to recover and separate the fissionable and fertile materials for further use and to separate the metallic fission products for various uses such as the use of neptunium-237 in production of plutonium-238.

A typical reprocessing sequence for irradiated nuclear fuel material starts with disassembling the fuel assemblies at a reprocessing site. In one representative method, a disassembly table is used to hold the fuel assembly in a fixed position and permit the withdrawal of the fuel element by longitudinal movement of the fuel element after removal of end fittings. This removal is typically accomplished with a rod pulling means which can be a portion of the disassembly table, with connection of the pulling means to the individual fuel elements. A collection means is used to hold the elements in a group for feeding to a shear which cuts the elements into short pieces.

The sheared fuel elements, containing the fission products and irradiated nuclear fuel, are charged to a solution for dissolution of the nuclear fuel material from the elements leaving behind the cladding hulls and fines, with a preferred solution being nitric acid. After the nuclear fuel is dissolved, the solution is removed to an extraction column. In the extraction column an organic liquid is used to separate the uranium, plutonium and neptunium from the fission products. The organic phase from the extraction column is treated by ion exchange for preferential absorption of plutonium and neptunium leaving a uranium-containing raffinate. The uranium-containing raffinate is concentrated and converted to $UO_3$ in a calciner. The $UO_3$ is converted to $UF_6$ in a fluorinator and the $UF_6$ is ready for any desired enrichment and subsequent processing into fuel elements of desired shape and configuration. This process leaves the fission products in nitrate form presenting a disposal problem for the nitrate portion and a recovery problem for the metallic value of the fission product. The metallic ions of importance are recovered leaving a nitrate-containing solution which must be disposed of. Accordingly, this is another point where a method of converting a nitrate-containing compound into gaseous nitrogen would be very desirable.

OBJECTS OF THE INVENTION

In addition to the objects set forth above, it is an object of this invention to provide a process for converting nitrogen-containing compounds in which at least a portion of the nitrogen has a positive valence into nitrogen gas suitable for release to the atmosphere. The conversion to gaseous nitrogen should be substantially complete so that the release of the resulting gaseous nitrogen does not introduce any polluting materials into the atmosphere. Further, the conversion process should be inexpensive and achieve a rapid conversion of the nitrogen-containing compound to nitrogen gas.

It is a preferred object of this invention to provide a process for converting nitrate compounds and nitric acid into nitrogen gas suitable for release to the atmosphere. The conversion avoids the problem of disposing of large volumes of liquid wastes containing nitrogenous materials.

A particularly preferred object of this invention is to provide a suitable process for converting waste condensate streams containing plutonium nitrate into releasable gaseous nitrogen after suitable scrubbing to remove residual plutonium while recovering the plutonium value in a solid form and scrubbing any liquid discharge for complete plutonium removal enabling disposal of the liquid without creating environmental pollution or health complications for mammalian life.

The foregoing objects enable the accomplishment of a further object of providing a method of generating a source of relative high purity gaseous nitrogen. In effect, liquid or solid nitrogenous waste materials are converted to gaseous nitrogen which can be containerized giving a relatively high purity nitrogen suitable for a number of applications.

The foregoing and other objects will be apparent to a person skilled in the art from a reading of the following specification and claims with reference to the accompanying drawings.

SUMMARY OF THE INVENTION

It has now been surprisingly discovered that nitrogenous waste materials containing at least a portion of the nitrogen in a positive valence can be rapidly converted to a releasable gaseous molecular nitrogen by calcining the nitrogenous material in a fluidized bed in the presence of a reducing agent containing ammonium ions. The residual metallic and non-metallic ions from the nitrogenous waste materials are disposed of as solid oxide calcine or treated for recovery if desirable. This process attains exceptionally high conversion of the waste materials to gaseous nitrogen since the ammonium ions impart a reducing nature to the calcination. The ammonium ions can be introduced in any convenient, readily heat decomposable form such as ammonia gas and ammonium compounds including ammonium hydroxide and ammonium salts.

The process is broadly applicable to the conversion of liquid nitrogenous waste materials, either containing ammonium ions or free of ammonium ions, including nitrogen-containing acids such as nitric acid and nitrous acid, nitrite salts, and nitrate salts such as uranyl nitrate, plutonium nitrate, ammonium nitrate, silver nitrate, aluminum nitrate, sodium nitrate, calcium nitrate, ferric nitrate and fission product nitrates such as ruthenium nitrate, lanthanium nitrate, cesium nitrate, strontium nitrate, etc.

The calcination process for the conversion of nitrogen-containing compounds to gaseous nitrogen can be represented by the following general reaction for a monovalent nitrate compound:

$$5\ NH_3 + 3\ M\ NO_3 \rightarrow 4\ N_2 + 1.5\ M_2O + 7.5\ H_2O,$$

where M is any monovalent cation with representative cations being $H^+$, $Na^+$, $K^+$ and $Cs^+$. Similar stoichiometric reactions are equally applicable to di-, tri- or other multiple valence cations with representative cations being $UO_2^{+2}$, $Ca^{+2}$, $PuO_2^{+2}$ and $Al^{+3}$.

In a preferred application of the present invention, liquid plutonium nitrate wastes are converted to releasable gaseous materials, largely gaseous nitrogen and water vapor, and the waste liquid condensate streams have plutonium contamination removed to a concentration less than $10^{+5}$ grams of plutonium per liter. This enables release after scrubbing of both the gaseous product and the liquid product from this process without atmospheric contamination. This process involves a fluidized bed calcination of the plutonium-bearing nitrate wastes in the presence of a reducing agent containing the ammonium ion which converts the nitrates substantially to molecular nitrogen. In this process residual plutonium and other trace metallic ions would be deposited as oxide calcines in the fluidized bed for recovery by standard recovery processes or for disposal as a solid waste. Further protection against any release of plutonium to the environment is assured by fractional distillation of aqueous condensates in which nonvolatile contaminates would be retained from the distillation step for recycle to the calciner and the clean distillate water would be discharged.

BRIEF DESCRIPTION OF THE DRAWINGS

Details of a preferred embodiment of the invention will be further understood upon reference to the drawings, wherein.

DETAILED DESCRIPTION OF THE INVENTION

Figure 1:
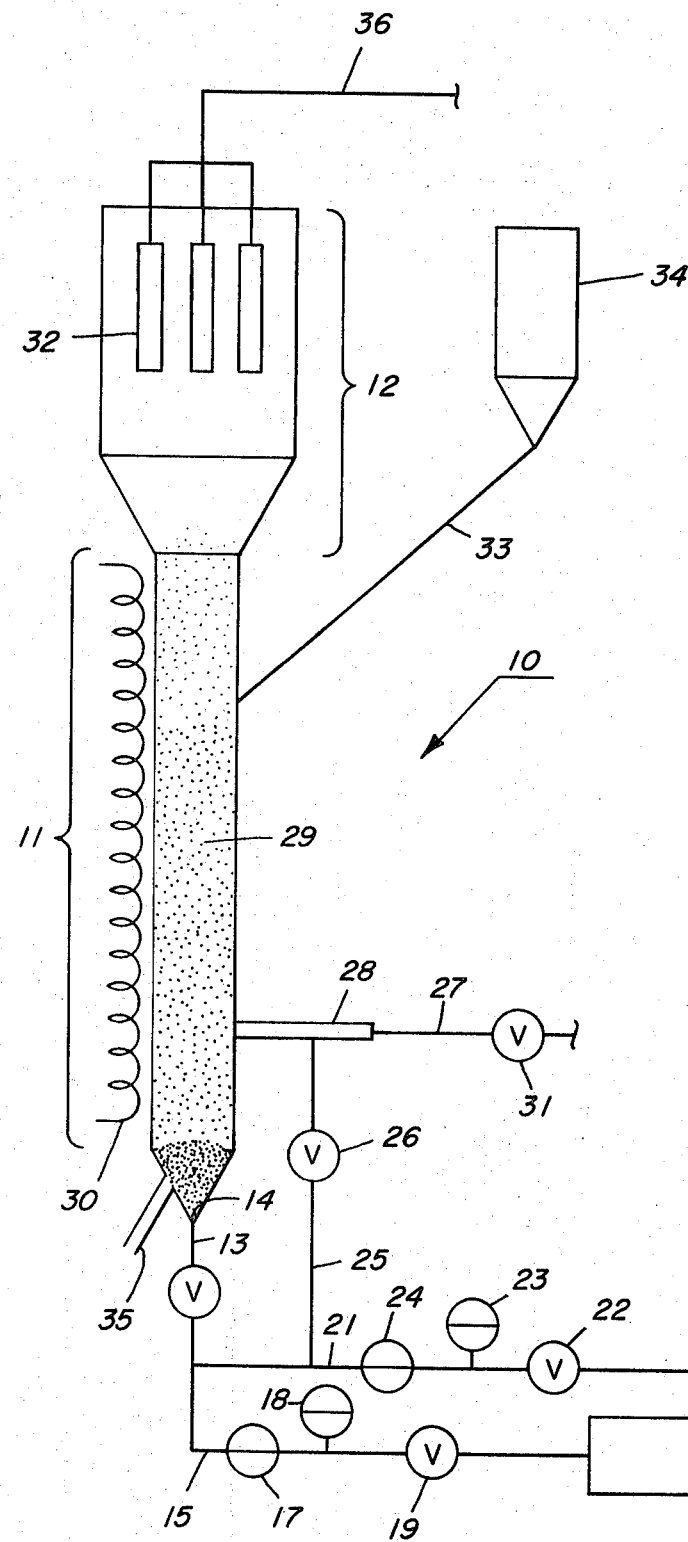
FIG. 1 is a schematic presentation of a fluidized bed embodiment with the fluidized bed container shown in section. The fluidized bed is adapted for practicing the calcination process for waste nitrogen-containing compounds as described in this invention.

It is the intent of this invention to include the reaction, or reactions, at elevated temperature within a fluidized bed of any nitrogen-containing compound containing at least a portion of the nitrogen in a positive valence state (oxidizing) with another compound containing nitrogen in a negative valence state (reducing) so that the product of the reaction is molecular nitrogen gas ($N_2$) or nitrogen with a zero valence state. In greater detail the practice of the process of this invention involves calcining nitrogen-containing compounds containing at least a portion of the nitrogen in a positive valence in the presence of a reducing agent resulting in a conversion of the compounds to gaseous nitrogen, water vapor and, depending upon the particular composition of the nitrogen-containing compounds, a possible solid calcine corresponding to the cation portion of the compounds. The nitrogen-containing compound is conveniently in the form of a liquid solution or is made up to be in the form of a liquid solution and is introduced in an atomized form to a fluidized bed apparatus. The reducing agent is a source of the ammonium ion such as ammonia and ammonium compounds including ammonium hydroxide and ammonium salts.

The calcining step is conducted at a temperature rapidly giving decomposition of the nitrogen-containing compound with a representative temperature being in the range of at least about 300° to about 600°C. Temperatures below this range have been found to give an insufficient rate of decomposition of the nitrogen-containing compounds while temperatures above this range have been found to result in an uneconomical dissipation of heat. The listing of compounds given above in the Summary of the Invention are subject to rapid decomposition within the foregoing temperature range in the presence of the reducing agents disclosed in this invention.

In still greater detail this invention involves establishing a heated fluidized bed of inert particles fluidized by a gaseous medium. The nitrogen-containing compound(s) to be converted to gaseous nitrogen is introduced to the fluidized bed in an atomized form along with introduction of a reducing agent selected from those listed above. After the inert particles are activated by the fluidizing medium, the nitrogen-containing compound and the reducing agent are introduced to the heated fluidized bed. A decomposition reaction occurs in a constricted portion of the fluidized bed and the gaseous products such as nitrogen and water vapor rise into the disengaging portion of the fluidized bed. The gaseous products can be filtered before they leave the fluidized bed. Subsequent treatment of the gases including condensation of the water vapor from the fluidized bed can be practiced if required to prevent release of even minute amounts of certain materials.

The practice of the foregoing process is described in detail with reference to FIG. 1 in which the number 10 generally represents a vessel shown in section for conducting a fluidized bed process having a smaller diameter or constricted portion 11 containing a particulate medium 29 forming the fluidized bed and a larger diameter or disengaging portion 12 which is substantially free of the fluidized bed due to the larger diameter of portion 12. Portion 11 is heated by external heating means 30 which can be coiled electrical resistance wiring placed adjacent portion 11 or wrapped around portion 11. In operation, a fluidizing medium such as a gas is introduced into the portion 11 through throat 14 from line 21 which merges into line 13 and which is connected to a source 20 of the fluidizing medium. Valve 22, flow meter 24 and pressure regulator 23 are provided to enable regulation of the flow of fluidizing medium to the fluidized bed 10. The reducing agent is introduced to portion 11 of the fluidized bed 10 from source 16 through line 15 which connects a line 13. Valve 19, pressure regulator 18 and flow meter 17 are provided to enable regulation of the flow of the reducing agent to the fluidized bed 10. Line 25 containing valve 26 is connected to line 21 enabling flow of the fluidizing medium from line 21 to feed nozzle 28 which enters portion 11 of fluidized bed 10. The liquid waste nitrogen-containing compound is introduced in an atomized form to portion 11 of fluidized bed 10 through line 27 and feed nozzle 28. Valve 31 is provided in line 27 for restricting the flow of liquid when desired such as for shutdown of the process.

If the process has the deposition of the cation portion of the waste nitrogen-containing compound on the particulate medium in the fluidized bed as a result of the decomposition of the nitrogen-containing compound, intermittent or continuous withdrawal of the larger particles which settle to the bottom of portion 11 is conducted through outlet 35. New particle medium is to the upper part of portion 11 from reservoir 34 through line 33. This introduction can be on a continuous basis at a controlled rate or on an intermittent basis.

The expanded portion 12 of fluidized bed 10 is arranged for gas removal with gas filters 32 serving to retain any fine solid particles being carried with the gaseous medium exiting portion 12 in line 36. Representative gas filters 32 are Feltmetal fiber metal filter elements with a nominal 3 micron retention capability measuring 2¾ inches in diameter and 6 inches in length.

Figure 2:
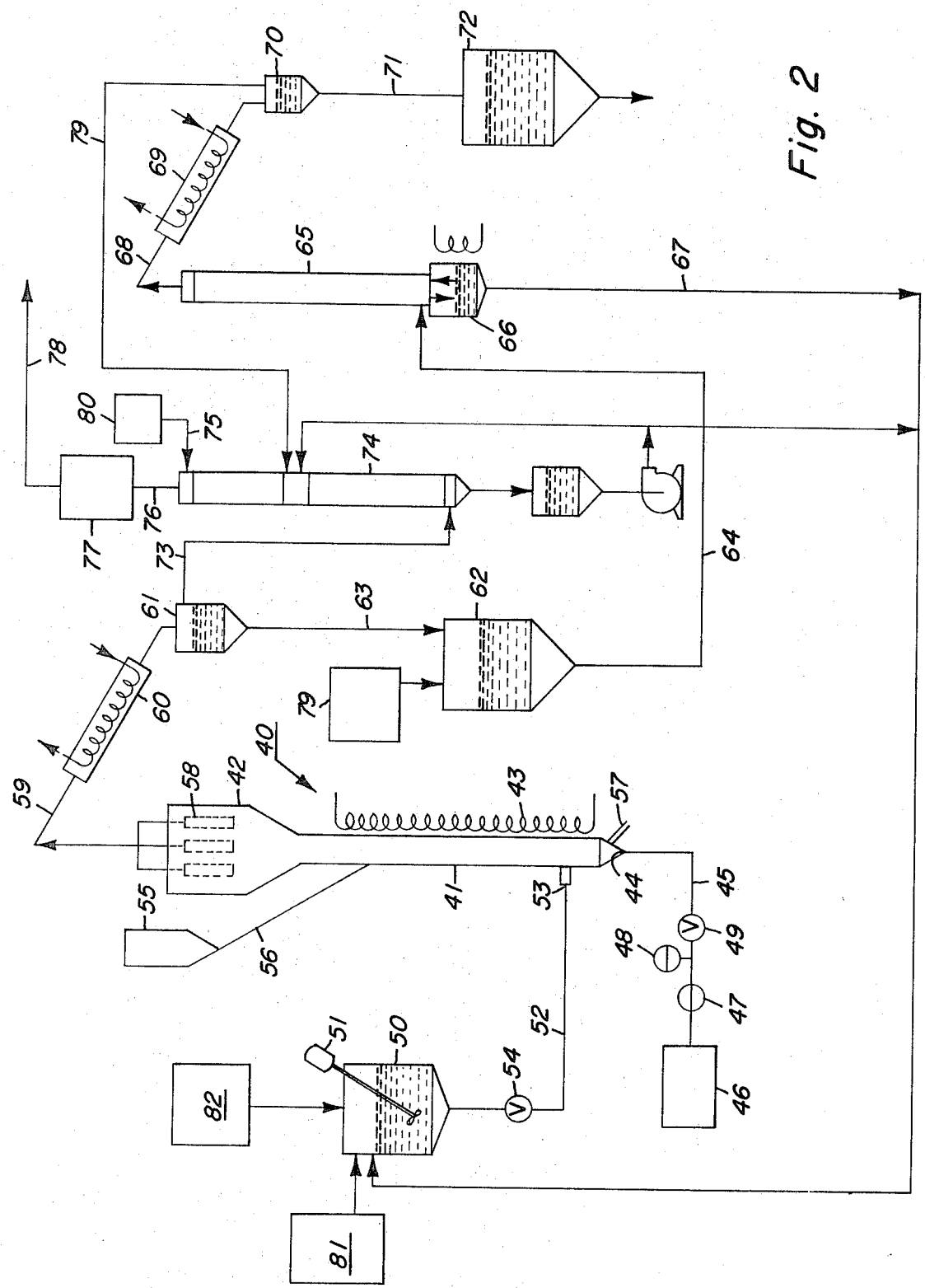
FIG. 2 is a schematic presentation of the fluidized bed embodiment along with associated equipment adapted for practicing the calcination process for liquid waste plutonium nitrate compounds in which release of plutonium to the environment is avoided.

Since one of the preferred uses of this invention is for the destruction of liquid wastes containing radioactive metallic nitrates, FIG. 2 presents an apparatus generally designated 40 for conducting a fluidized bed process having a smaller diameter portion 41 containing a fluidized bed and a larger diameter portion 42 which is substantially free of the fluidized bed due to its expanded diameter. Portion 41 is heated by external heating means 43 which can be electrical resistance wiring placed adjacent portion 41 or wrapped around portion 41. The operation of the bed is similar to the bed in FIG. 1 with a fluidizing medium such as a gas being introduced into the portion 41 through throat 44 from line 45 which is connected to a source 46 of the fluidizing medium. Flow meter 47, pressure regulator 48 and valve 49 are provided to enable regulation of the flow of fluidizing medium to the fluidized bed 40. The reducing agent from source 81 and waste nitrogen-containing material from source 82 are introduced to tank 50 and then to portion 41 of the fluidized bed 40. The tank 50 has stirring means 51 for mixing the incoming materials and line 52 leading to entry port 53 near the bottom of portion 41. Valve 54 is provided in line 52 for purposes of stopping the flow in line 52 when desired, such as for shutdown.

In this process there is the deposition of the cation of the waste nitrogen-containing compound on the particulate medium in the fluidized bed as a result of the decomposition of the nitrogen-containing compound. Intermittent or continuous withdrawal of the larger particles which settle to the bottom of portion 41 is conducted through outlet 57. New particle medium is introduced to the upper part of portion 41 from reservoir 55 through line 56. This introduction can be on a continuous basis at a controlled rate or on an intermittent basis.

The expanded portion 42 of fluidized bed 40 is arranged for gas removal with gas filters 58 serving to retain any fine solid particles being carried with the gaseous medium exiting portion 42 in line 59 with representative gas filters 58 being the same as described above for FIG. 1.

Condenser 60 is provided in line 59 for condensing water vapor from the effluent gas in line 59 which is collected in reservoir 61 and fed to neutralization tank 62 through line 63. Appropriate portions of base are added to tank 62 from source 79 to neutralize any acid in the condensate. Line 64 feeds the solution from tank 62 to distillation column 65 which withdraws a plutonium solution of very low concentration for collection in tank 66 which is partially recycled to tank 50 while the distillate in line 68 is condensed in condenser 69 and collected in tank 70 which is connected in turn to quarantine tank 72 by line 71. At appropriate times the liquid in tank 72 (which contains water free of any plutonium contamination) is discharged to the ground or other desired location.

At tank 61 uncondensed gas from line 59 and tank 61 is fed in line 73 to the bottom of scrubber 74 to which fresh scrub water is fed in line 75 from source 80. The gas passes out the top of scrubber 74 in line 76 to absolute filter 77 and is then released to the atmosphere from line 78. Venting vapors from tank 70 are fed to the middle portion of scrubber 74 in line 79. This process insures no release of the metallic cation from the nitrate waste material either in the gaseous discharge or the aqueous discharge.

In the practice of this invention the fluidizing gas is introduced at a controlled flow rate of about 0.9 to about 1.1 feet per second of superficial fluidizing velocity. An initial charge of particles having a size range of about 70 to about 500 microns forms a bed which is easily fluidized by the fluidizing medium. The temperature of the fluidized bed can be measured by thermocouples which are sealed into the vessel containing the fluidized bed. The feed solution containing the waste nitrogen-containing compound is fed in atomized form into the fluidized bed at the rate of about 3 to about 11 milliliters per minute. Where the cation of the nitrogen-containing compound deposits on the particles in the fluidized bed to form a coating on the particles, the particles reaching a size in the range of about 500 to about 800 microns are withdrawn from the fluidized bed at the discretion of the person running the process. The particles in the fluidized bed can be of various compositions with silica and aluminum oxide ($Al_2O_3$) being representative.

Various materials can be used in constructing the vessel and the inlets with preferred materials being the 300 series stainless steels. Since one of the preferred uses of this invention is for the destruction of liquid wastes containing radioactive metallic nitrates such as plutonium nitrates, the fluidized bed for such a process is mounted in a "hot cell" which is a highly shielded space with a controlled atmosphere equipped with instruments for remote handling of the necessary incoming reactants and outgoing solids, liquids and gases.

It should be noted that the advantages attained by the present invention are achieved by introducing the reducing agent as set forth above with the waste liquid nitrogen-containing compounds. Where the nitrogen-containing compound contains ammonium ions, additional ammonium ions may be added to insure a reducing environment for the reaction. This invention enables substantially complete conversion of such nitrogen-containing compounds to molecular nitrogen. Since the conversion is so substantially complete the gaseous product can be released to the atmosphere avoiding any pollution problems.

A better understanding of the present invention can be had from the description of the following examples. These examples are illustrative in nature and in no way are to be construed as restricting the scope of the present invention.

EXAMPLE 1

The apparatus illustrated in FIG. 1 is used. The fluidized bed portion 11 consists of a 20-inch length of 2-inch diameter schedule 40 type 304 stainless steel pipe. A portion 12 of 6-inch diameter schedule 40 pipe is connected to the top of the portion 11 by a tapered pipe to form a disengaging chamber. The liquid feed nozzle 28 is a tube and annulus arrangement and consists of an inside tube having 1/16-inch outside diameter and a 0.012-inch thick wall. This tube carries the liquid waste stream. The outer tube forms the annulus and has ⅛-inch outside diameter and a 0.02 inch thick wall. The liquid stream is pumped to the feed nozzle by means of a Lapp model LS-30 Microflo metering pump.

The gas inlet lines 15, 21, and 25 are ¼-inch stainless steel tubing. The liquid feed line 27 is ⅛-inch stainless steel tubing. Filters 32 are of the type described above. The off gas line (36) from the filters is ½-inch stainless steel tubing.

The provisions for heating consist of vertical electrical strip heating elements arranged uniformly. Maximum power available is 3.0 kilowatts. Heaters are controlled by a proportional temperature controller. A fluidized bed of 730 grams of 100-mesh silica sand is maintained at 400°C in portion 11.

Aqueous liquid feed with composition of
| | |
|---|---|
| $HNO_3$ | 5.25 gram moles per liter, |
| $Al(NO_3)_3$ | 0.75 gram moles per liter, |
| $UO_2(NO_3)_2$ | 0.48 gram moles per liter, |

Aqueous liquid feed with composition of
| | |
|---|---|
| $NaNO_3$ | 0.05 gram moles per liter, and |
| $CaF_2$ | 0.03 gram moles per liter, | is fed at a rate of 10 milliliters per minute for 90 minutes. Ammonia gas is fed at a rate of 3 grams per minute and fluidizing nitrogen at 12.7 grams per minute. The resulting effluent from the nitrate fed is determined by analysis in weight percent as follows:

| | |
|---|---|
| $NO_3^-$ | 21.006% |
| $NO_2^-$ | <.20% |
| $N_2$ | 98.1% |
| $N_2O$ | 1.7% |

EXAMPLES 2–12

The procedure of Example 1 is repeated using the same apparatus with the results being reported in Table 1. In Table 1, the first column has the Example number, the second column gives the composition of the fluidizing gas, the third column gives the stoichiometric excess or deficiency of the ammonia introduced to the reaction, the fourth, fifth, and sixth columns give the weight percentage of gas recovered as nitrate, nitrite and non-condensable gases ($N_2$ and $N_2O$).

TABLE I

| Example | Fluidizing Gas | Stoichiometric Excess or (Deficiency) of Ammonia (%) | Disposition of Nitrate Recovered as | | |
|---|---|---|---|---|---|
| | | | Nitrate ($NO^-_3$) (%) | Nitrite ($NO^-_2$) (%) | Non-Condensable Gases ($N_2$ and $N_2O$) (%) |
| 2 | Nitrogen | 52 | 0.6 | 0.6 | 98.8 |
| 3 | Steam | 33 | 0.4 | 0.3 | 99.3 |
| 4 | Steam | 19 | 1.6 | 1.4 | 97.0 |
| 5 | Steam | 15 | 1.9 | 8.6 | 89.5 |
| 6 | Steam | 21 | 0.2 | 1.6 | 98.2 |
| 7 | Nitrogen | (7) | 5.9 | 3.5 | 90.6 |
| 8 | Nitrogen | 16 | <0.1 | <0.1 | >99.9 |
| 9 | Nitrogen | 16 | <0.1 | <0.1 | >99.9 |
| 10 | Nitrogen | 31 | <0.1 | <0.1 | >99.9 |
| 11 | Nitrogen | 27 | 0.1 | <0.1 | 99.9 |
| 12 | Nitrogen | 32 | 0.4 | <0.3 | 99.3 |

From this it is apparent that an excess of ammonia is desirable to give a maximum of non-condensable gases.

As will be apparent to those skilled in the art, various modifications and changes may be made in the method

What is claimed is:

1. A method of converting the nitrogen portion of a nitrogen-containing compound selected from the group consisting of nitric acid, nitrons acid, nitrite salts, nitrate salts and fission product nitrates to gaseous nitrogen comprising the step of calcining the nitrogen-containing compound and a reducing agent selected from the group consisting of ammonia, ammonium compounds and mixtures thereof.

2. A method according to claim 1 in which a molar excess of the reducing agent is employed.

3. A method according to claim 1 in which the nitrogen-containing compound is dispersed in water and is calcined in an atomized form.

4. A method according to claim 1 in which the nitrogen-containing compound is a metallic nitrate.

5. A method according to claim 1 in which the nitrogen-containing compound is a metallic nitrite.

6. A method according to claim 1 in which the nitrogen-containing compound is nitric acid.

7. A method according to claim 1 in which the reducing agent is ammonia.

8. A method according to claim 1 in which the reducing agent is ammonium hydroxide.

9. A method according to claim 1 in which the temperature of the calcining step is in the range of about 300°C to about 600°C.

10. A method according to claim 1 in which the nitrogen-containing compound is dispersed in an aqueous solution.

11. A method according to claim 1 in which the nitrogen-containing compound is plutonium nitrate in an aqueous solution and the water vapor is condensed and passed through a distillation step to insure removal of plutonium and the resulting gases are passed through a scrubber to insure removal of plutonium.

12. A method of converting liquid waste nitrogen-containing compounds selected from the group consisting of nitric acid, nitrous acid, nitrite salts, nitrate salts and fission product nitrates to molecular nitrogen comprising the steps of (a) establishing a heated bed of inert particles fluidized by a gaseous medium and (b) introducing the nitrogen-containing compounds to the fluidized bed in the presence of a reducing agent selected from the group consisting of ammonia, ammonium compounds and mixtures thereof.

13. A method according to claim 12 in which a molar excess of the reducing agent is employed.

14. A method according to claim 12 in which the nitrogen-containing compounds are calcined in an atomized form.

15. A method according to claim 12 in which the nitrogen-containing compounds are metallic nitrates.

16. A method according to claim 12 in which the nitrogen-containing compounds are metallic nitrites.

17. A method according to claim 12 in which the nitrogen-containing compounds include nitric acid.

18. A method according to claim 12 in which the reducing agent is ammonia.

19. A method according to claim 12 in which the reducing agent is ammonium hydroxide.

20. A method according to claim 12 in which the temperature of the heated bed of inert particles is in the range of about 300°C to about 600°C.

21. A method according to claim 12 in which the nitrogen-containing compound is dispersed in an aqueous solution.

22. A method according to claim 12 in which the bed of inert particles is comprised of silicon dioxide.

23. A method of converting a nitrogen-containing compound of plutonium to gaseous nitrogen and a solid compound of plutonium comprising the steps of (a) establishing a heated bed of inert particles fluidized by a gaseous medium, (b) introducing the nitrogen-containing compound to the fluidized bed in an atomized form in the presence of a reducing agent selected from the group consisting of ammonia, ammonium compounds and mixtures thereof.

* * * * *

UNITED STATES PATENT OFFICE
CERTIFICATE OF CORRECTION

PATENT NO. : 3,862,296
DATED : 21 January 1975
INVENTOR(S) : James M. Dotson et al It is certified that error appears in the above-identified patent and that said Letters Patent are hereby corrected as shown below:

Column 3, Line 53, after "use" insert --is--

Column 5, Line 51, delete "$10^{+5}$" and insert in its place --$10^{-5}$--

Column 7, Line 43, after "is" insert --introduced--

Column 10, Line 20, delete "Aqueous liquid feed with composition of"

Column 10, Line 30, delete "21.006%" and insert -- <.006%--

Column 11, Claim 1, Line 3, "nitrons" whould be --nitrous--

Signed and Sealed this

Fifth Day of September 1978

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 3,862,296  Dated January 21, 1975

Inventor(s) James M. Dotson et al.

It is certified that error appears in the above-identified patent and that said Letters Patent are hereby corrected as shown below:

Column 12, Claim 23, line 40, after "thereof", insert

-- (c) condensing the resulting water vapor, (d) distilling the condensate to insure removal of plutonium from the condensate and (e) passing the resulting gases through a scrubber to insure removal of plutonium. --

Signed and Sealed this

Twelfth Day of December 1978

[SEAL]

Attest:

RUTH C. MASON
Attesting Officer

DONALD W. BANNER
Commissioner of Patents and Trademarks